No. 661,941. Patented Nov. 13, 1900.
J. L. SULLIVAN & W. MAHONEY.
CHAIN CAR COUPLING.
(Application filed Sept. 21, 1900.)
(No Model.)
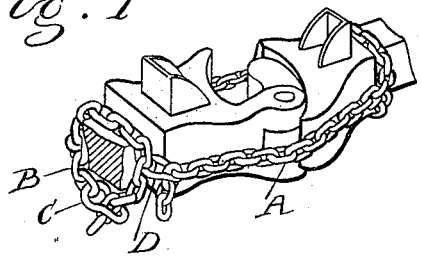
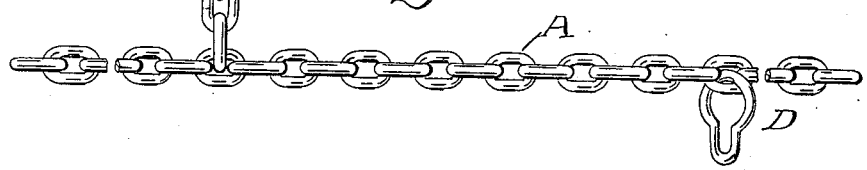
Witnesses
Harry A. Brooks
Mattie McGinnis
John L. Sullivan
William Mahoney
Inventors
By
Hazard & Harpham
Attorneys

UNITED STATES PATENT OFFICE.

JOHN L. SULLIVAN AND WILLIAM MAHONEY, OF LOS ANGELES, CALIFORNIA.

CHAIN CAR-COUPLING.

SPECIFICATION forming part of Letters Patent No. 661,941, dated November 13, 1900.

Application filed September 21, 1900. Serial No. 30,723. (No model.)

*To all whom it may concern:*

Be it known that we, JOHN L. SULLIVAN and WILLIAM MAHONEY, citizens of the United States, residing at Los Angeles, in the county of Los Angeles and State of California, have invented new and useful Improvements in Chain Car-Couplings, of which the following is a specification.

Our invention relates to an emergency coupler for cars for use when the coupler with which the car is usually coupled to another is broken; and the object thereof is to provide an emergency coupling-chain which is easily and quickly attached to the draw-bars and then coupled.

We accomplish this object by the chain coupling described herein and illustrated in the accompanying drawings, forming a part hereof, in which—

Figure 1 is a perspective view of parts of two draw heads and bars attached together by our emergency coupling-chain. Fig. 2 is an elevation of our coupling-chain detached from the draw-heads.

Heretofore when the ordinary coupling of the car has become broken, so that it will no longer couple the cars together, it has been usual to employ a long heavy chain having hooks on the end which was passed around the draw-bar back of the sills of the car, and each end was then hooked into a link or otherwise fastened to secure the chain around the draw-bar. This mode of coupling requires a very long and heavy chain, and in its use it is necessary for the brakeman to crawl under the car in order to place and fasten the chain. As the chain is very long and heavy it requires the services of two men, and considerable time is consumed in making a coupling, and the cars are held together by the strength of a single chain. In this form of coupling there is always considerable slack in the chain, which renders it liable to be broken unless a very heavy chain is used. In our chain coupling these objections are largely avoided.

In the drawings, A is the main body of the chain, formed of heavy links, which is provided with a short branch B, terminating in coupling-link C, the upper portion C' of which is large enough for the body of the chain to be passed freely therethrough, while the lower portion C" is contracted, so that a link of body A will pass therein edgewise and will be held from slipping therethrough by the links at either end of the link. Body A is provided with a similar coupling-link D at a suitable distance from branch B. In Fig. 1 we have shown a pair of draw-heads E, one of which is broken, with draw-bars F, partly in section, coupled together by our chain coupling, which is used as follows:

Whenever one of the draw-heads becomes broken, so that the cars cannot be coupled together thereby, the cars are pushed together in the usual manner until the draw-heads are in the position they would be in when coupled together. The chain is then placed on the draw-bar just back of the draw-head, preferably so that the junction of branch B with body A shall be at one side thereof and coupling-link D shall be at the other side. Branch B is then brought around the draw-bar and the end of the chain run through coupling-link in the end of the branch until the chain is drawn tightly around the draw-bar just back of the draw-head, when a link is slipped into the narrow portion of link C. A similar chain is then fastened around the other draw-head, so that the link D thereof shall be on the opposite side from the link D on the other draw-bar. The free end of each chain is then run through the coupling-link D of the opposite chain and drawn taut, and a link is slipped in the bottom portion thereof, which completes the coupling. It will be seen that by this construction a chain with lighter links may be used, as there are two chains to stand the strain, also that the chain can be put on the draw-bar without going beneath the car and that as the weight is much less than that of the single chain as commonly used for that purpose and is divided into two parts a single brakeman can make an emergency coupling with our chain in less time than a coupling can be made by two men using a single chain in the old way.

Having described our invention, what we claim as new, and desire to secure by Letters Patent, is—

The herein-described coupling-chain, comprising a body portion having a branch portion terminating in a coupling-link, whose top portion is adapted for the passage therethrough of the links of the chain, and the lower portion thereof being adapted to receive a link therein when inserted edgewise, and to prevent the chain from slipping therethrough, said body portion also having thereon a like coupling-link at a suitable distance from the branch.

In witness that we claim the foregoing we have hereunto subscribed our names, this 15th day of September, 1900, at Los Angeles, California.

JOHN L. SULLIVAN.
WILLIAM MAHONEY.

Witnesses:
G. E. HARPHAM,
MATTIE MCGINNIS.